(12) United States Patent
Chisholm et al.

(10) Patent No.: US 6,978,302 B1
(45) Date of Patent: Dec. 20, 2005

(54) NETWORK MANAGEMENT APPARATUS AND METHOD FOR IDENTIFYING CAUSAL EVENTS ON A NETWORK

(75) Inventors: Alastair Hugh Chisholm, Edinburgh (GB); David James Stevenson, Edinburgh (GB); Robert James Duncan, Edinburgh (GB); Ronan François Daniel Grandin, Edinburgh (GB); Neil William Gray, Livingston (GB)

(73) Assignee: 3Com Corporation, Santa Clara, CA (US)

( * ) Notice: Subject to any disclaimer, the term of this patent is extended or adjusted under 35 U.S.C. 154(b) by 543 days.

(21) Appl. No.: 09/691,649

(22) Filed: Oct. 17, 2000

(30) Foreign Application Priority Data

May 17, 2000 (GB) .............................. 0011935

(51) Int. Cl.[7] ........................................... G06F 15/173

(52) U.S. Cl. ...................... 709/224; 709/223; 714/43; 370/242; 370/248

(58) Field of Search ............................... 709/223, 224; 714/43, 25, 40; 370/241, 242, 248

(56) References Cited

U.S. PATENT DOCUMENTS

| | | | | | |
|---|---|---|---|---|---|
| 5,185,860 | A | * | 2/1993 | Wu ............................. | 709/224 |
| 5,276,789 | A | * | 1/1994 | Besaw et al. ................ | 345/440 |
| 5,309,448 | A | * | 5/1994 | Bouloutas et al. ............ | 714/25 |
| 5,771,274 | A | * | 6/1998 | Harris ...................... | 379/22.03 |
| 5,864,662 | A | * | 1/1999 | Brownmiller et al. ........ | 714/43 |
| 5,920,257 | A | * | 7/1999 | Commerford ............... | 340/506 |
| 5,946,373 | A | * | 8/1999 | Harris ...................... | 379/14.01 |
| 6,061,723 | A | * | 5/2000 | Walker et al. ............... | 709/224 |

(Continued)

FOREIGN PATENT DOCUMENTS

GB        2362536 A    *  11/2001    ............ H04Q/3/00

OTHER PUBLICATIONS

Chao et al., "An Automated Fault Diagnosis System Using Hierarchical Reasoning and Alarm Correlation," Jul. 1999, IEEE Workshop on Internet Applications, 1999, pp. 120–127.*

Hasan et al., "A Conceptual Framework for Network Management Event Correlation and Filtering Systems," May 1999, Proceedings of the Sixth IFIP/IEEE International Symposium on Integrated Network Management, 1999, pp. 233–246.*

Business Wire, "Tivoli Manager for Network Connectivity Increases Availability of Business–Critical Applications," Nov. 30, 199 Business Wire, New York, pp. 1ff.*

Sheers, "HP OpenView Event Correlation Services," Oct. 1996, Hewlett–Packard Journal, Article 4, pp. 1–10, sidebar: Correlation Node Types pp. 1–2, sidebar: Count Node p. 1.*

LeFevre, "Correlation is King for Seagate NerveCenter. (Product Information)," Mar. 18, 1998, ENT, printed from www.findarticles.com/cf_dis/m0FOX/n4_20829606/print-.jhtml, pp. 1–2.*

*Primary Examiner*—Bradley Edelman
(74) *Attorney, Agent, or Firm*—McDonnell Boehnen Hulbert & Berghoff LLP

(57) ABSTRACT

A network management apparatus and method for identifying an event which is indicative of the underlying cause of more than one of a plurality of events detected by a network management station on a network is described in which the management station has knowledge of the topology of the network. Using the topology of the network, the apparatus and method considers the location of the network device causing each event in the plurality of events, and determines as the causal event, the event which has occurred at a location closest to the network management station. The method is preferably implemented in the form of a computer program.

18 Claims, 2 Drawing Sheets

U.S. PATENT DOCUMENTS

| | | | |
|---|---|---|---|
| 6,173,323 B1 * | 1/2001 | Moghe | 709/224 |
| 6,249,755 B1 * | 6/2001 | Yemini et al. | 702/183 |
| 6,252,852 B1 * | 6/2001 | Rowles et al. | 370/242 |
| 6,253,339 B1 * | 6/2001 | Tse et al. | 714/47 |
| 6,263,455 B1 * | 7/2001 | Bannister | 714/25 |
| 6,457,143 B1 * | 9/2002 | Yue | 714/43 |
| 6,570,867 B1 * | 5/2003 | Robinson et al. | 370/351 |
| 6,598,033 B2 * | 7/2003 | Ross et al. | 706/46 |
| 6,707,795 B1 * | 3/2004 | Noorhosseini et al. | 370/242 |
| 6,718,382 B1 * | 4/2004 | Li et al. | 709/224 |
| 6,757,850 B1 * | 6/2004 | Lehner | 714/48 |
| 6,813,634 B1 * | 11/2004 | Ahmed | 709/224 |

* cited by examiner

NETWORK MANAGEMENT APPARATUS AND METHOD FOR IDENTIFYING CAUSAL EVENTS ON A NETWORK

BACKGROUND OF THE INVENTION

1. Field of the Invention

The present invention relates generally to an apparatus and method for the management of a network, and more particularly to a network management apparatus capable of determining the topology of a network and method for such an apparatus.

2. Description of the Related Art

The following description is concerned with a data communications network, and in particular a local area network (LAN) but has more widespread applicability to other managed communications systems including wide area networks (WANs) or wireless communications systems.

Networks typically comprise a plurality of computers, peripherals and other electronic devices capable of communicating with each other by sending and receiving data packets in accordance with a predefined network protocol. Each computer or other device on the network is connected by a port to the network media, which in the case of a LAN network may be coaxial cable, twisted pair cable or fibre optic cable. Each device on the network typically has hardware for media access control (MAC) with its own unique MAC address. Data packets are sent and received in accordance with the MAC protocol (e.g. CSMA/CD protocol as defined by the standard IEEE 802.2, commonly known as Ethernet). Data packets transmitted using the MAC protocol identify the source MAC address (i.e. the MAC address of the device sending the data packet) and the destination MAC address (i.e. the MAC address of the device for which the data packet is destined) in the header of the data packet.

A network is generally configured with core devices having a plurality of ports, which can be used to interconnect a plurality of media links on the network. Such devices include hubs, repeaters, routers and switches which pass data packets received at one port to one or more of its other ports, depending upon the type of device. Such core devices can either be managed or unmanaged.

A managed device is capable of monitoring data packets passing through its ports. For example, a managed device can learn the physical or MAC addresses of the devices connected to its ports by monitoring the source address of data packets passing through the respective ports. Identified source addresses transmitted from a port of a managed network device, such as a router, hub, repeater or switch, are stored in a respective "address table" associated with the port, as described further below.

Managed devices additionally have the capability of communicating with each other using a management protocol such as the Simple Network Management Protocol (SNMP), as described in more detail below. Whilst the following description is concerned with the SNMP management protocol the skilled person will appreciate that the invention is not limited to use with SNMP, but can be applied to managed networks using other network management protocols.

SNMP defines agents, managers and MIBs (where MIB is Management Information Base), as well as various predefined messages and commands for data communication. An agent is present in each managed network device and stores management data, responds to requests from the manager using the GETRESPONSE message and may send a TRAP message to the manager after sensing a predefined condition. A manager is present within the network management station of a network and automatically interrogates the agents of managed devices on the network using various SNMP commands such as GET and GETNEXT commands, to obtain information suitable for use by the network administrator, whose function is described below. A MIB is a managed "object" database which stores management data obtained by managed devices, accessible to agents for network management applications.

SNMP, along with the standard IEEE 802.2 (Ethernet) protocol, forms part of the TCP/IP protocol suite, which is a number of associated protocols developed for networks connected to the Internet.

It is becoming increasingly common for an individual, called the network administrator, to be responsible for network management, and his or her computer system or workstation is typically designated the network management station. The network management station incorporates the manager, as defined in the SNMP protocol, i.e. the necessary hardware, and software applications to retrieve data from MIBs by sending standard SNMP requests to the agents of managed devices on the network.

Network management software applications are known which can determine the topology of a network, i.e. the devices on the network and how they are linked together. In order to determine the network topology, the application retrieves data from the managed devices on the network, which data can provide information about the devices connected to the managed devices, for instance the aforementioned "address tables". MIB data retrieved from managed devices can also provide information about device type, device addresses and details about the links. Using such data, the application can usually determine the topology of the entire network.

An example of a known network management software application capable of determining network topology is the Transcend® Network Supervisor application available from 3Com Corporation of Santa Clara, Calif., USA.

A part of the network administrator's function is to identify and resolve problems occurring on the network, such as device or link malfunction or failure. In order to provide the network administrator with the necessary information to identify such problems, the network management software application continually monitors the devices on the network. For example, it periodically retrieves from managed network devices selected MIB data indicative of device and link operation, and at periodic intervals performs tests for device activity and service availability. Such tests may include sending ICMP Ping requests to every known device on the network, or sending selected requests for services such as SMTP, NFS and DNS to servers, and monitoring the time taken to receive a response.

The network management application compares the retrieved data and test results against corresponding threshold levels, above which performance is considered to be unacceptable. Such thresholds may be preset by the application vendor, or may be set by the network administrator. Each time a threshold is exceeded, the application logs an "Event". The "Event log" lists each Event, including information such as the date and time of the Event, the identity of the device affected and the nature of the Event. The network administrator can then review the Event list to identify problems on the network.

A problem with this way of identifying problems on the network is that if a core network device, or a trunk link, fails, it will cause a large number of Events to be logged on the Event log. This large number of Events results because the network management station does not receive responses to data requests or tests from devices which are "downstream" from the failed device or link relative to the management system. Thus, an Event will be logged each time the network management station fails to receive a response from such devices. This "flooding" of Events makes it difficult for the network administrator to determine whether there are a number of unrelated problems occurring on the network, or there is a single root cause for the "avalanche" of Events and if so, where the cause lies.

It would be desirable to provide a network management apparatus and method which overcomes this problem.

SUMMARY OF THE INVENTION

In accordance with a first aspect, the present invention provides a method for identifying an event among a plurality of events detected by a network management station on a network, which event is indicative of the underlying cause of more than one of said plurality of events, wherein the network management station knows the topology of the network, the method comprising the steps of: considering the location of the network device causing each event in the plurality of events and determining as said event, the event which has occurred at a location closest to the network management station.

The method thus determines the causal Event, which can be presented to the network administrator. In this way the network administrator can immediately identify and concentrate on the area of the network causing the problem.

In accordance with a second aspect, the present invention provides a computer readable medium carrying a computer program for carrying out the method of the first aspect of the present invention.

Further preferred features and advantages of the present invention will be apparent from the following description and accompanying claims.

BRIEF DESCRIPTION OF THE DRAWINGS

An embodiment of the present invention will now be described, by way of example, with reference to the accompanying drawings, in which.

DETAILED DESCRIPTION OF THE PREFERRED EMBODIMENTS

Figure 1:
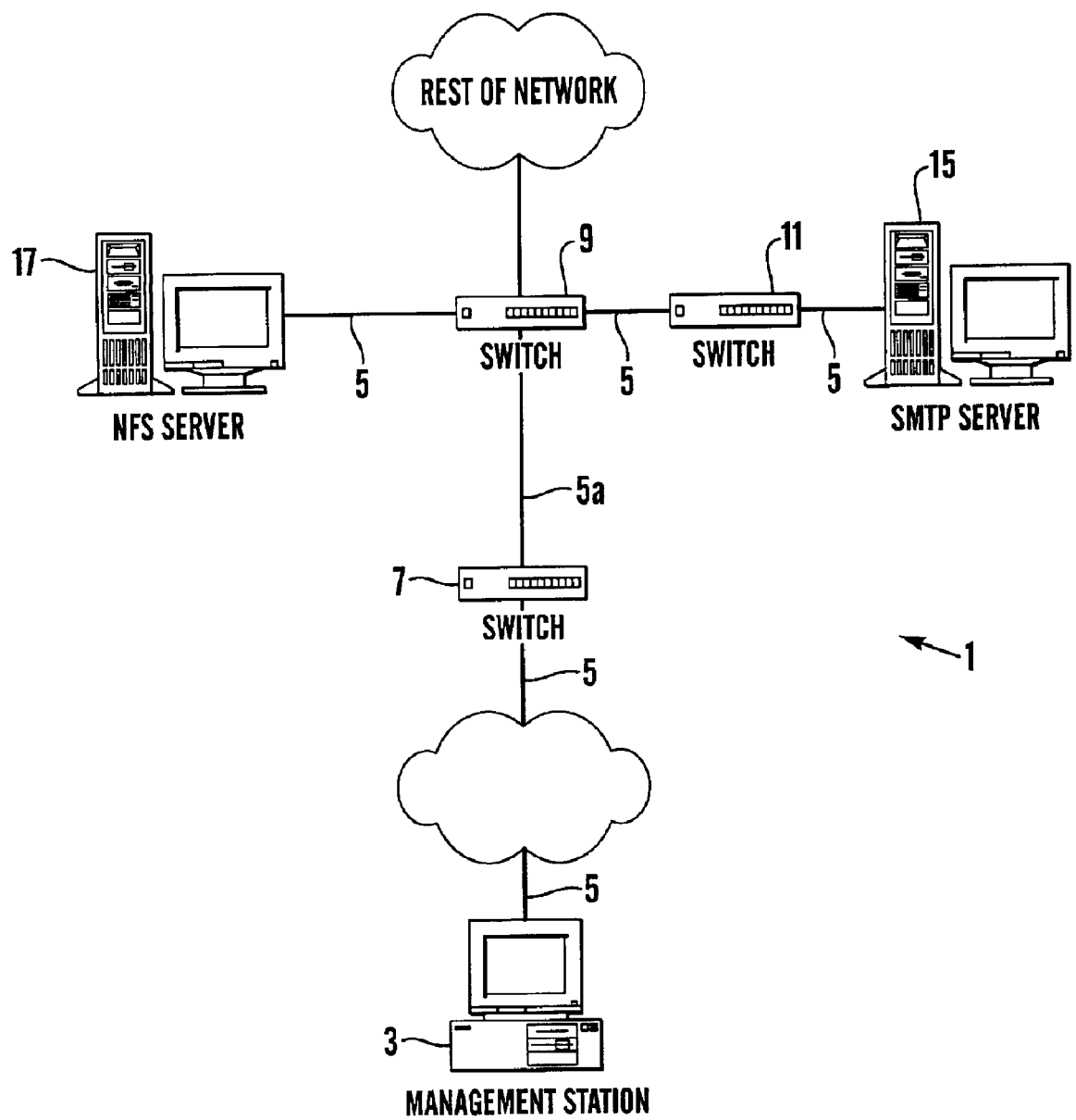
FIG. 1 shows a typical LAN network having a network management station in accordance with a preferred embodiment of the present invention.

FIG. 1 shows a typical local area network 1 having a network management station 3 in accordance with a preferred embodiment of the present invention. The network 1 includes SNMP managed core network devices including switches 7, 9 and 11, and network servers including SMTP server 15 and NFS server 17 all connected together by media links 5. The network management station 3 is provided for the network administrator. Other end stations (not shown) are provided for users to obtain services from devices on the network 1. For instance SMTP server 15 enables users to send and receive email messages on the Internet.

Switches 7, 9 and 11, together with network management station 3 communicate management information using the SNMP protocol. In a preferred embodiment, all of these core managed network devices are configured to send the standard SNMP "link-down" TRAP message when a link connected to one of its ports is disconnected or otherwise fails so that messages cannot be passed over the link.

The network management station 3 "knows" the topology of the network 1. Specifically, the network management station has access to memory which stores data relating to the network topology. This data may be obtained, for example, by the running a network management application capable of "discovering" the network topology. Alternatively, the network administrator may manually enter details of the network topology. Accordingly, the network management station 3 stores in memory a data representation or model of the network arrangement for each network element i.e. each network device and link. For each device, the data representation indicates the links which are connected to it (and if appropriate, at which port), and for each link, the data representation indicates the two devices connected to the link.

The data representation can be used to determine the path(s) between any two devices on the relevant network. This may be achieved, for example, as described in UK Patent Application No 0009120.7 filed 13 Apr. 2000 in the name of the present applicant.

The network management station 3, under the control of the network administrator, monitors the devices on the network. In particular, the network management station 3, at periodic intervals, automatically sends messages to the devices on the network, including ICMP Ping requests to all network devices to test for device activity, SMTP service requests to SMTP server 15, and SNMP requests to switches 7, 9 and 11. The network management station 3 monitors the time taken to receive a response to these requests, and processes SNMP MIB data retrieved by SNMP requests.

The network management station 3 has preset thresholds for each response time. Typical examples of thresholds are indicated in Table 1.

TABLE 1

| Request | Response time threshold |
| --- | --- |
| ICMP Ping | 1000 ms |
| NFS Service | 1000 ms |
| SMTP Service | 1000 ms |
| SNMP Request | 6000 ms |

The threshold represents the maximum acceptable time for the response to be received by the network management station 3. If the response is not received within the threshold time, the network management station 3 determines that an Event has occurred, and stores Event information in memory, including details of the nature and time of the request, an identification of the device to which the request was sent and the time taken for the response to be received, if applicable. In addition to the response time threshold, the network management station 3 has a second threshold which represents the maximum time the system will wait for a response. If no response is received within this second threshold time the response is said to be "timed out", and an Event is recorded to indicate that no response was received. Each recorded Event may be listed as shown in Table 2 below.

TABLE 2

| Time  | Device Name | Device Type | Description                   |
|-------|-------------|-------------|-------------------------------|
| 11.06 | NFS Server  | Server      | IP Ping timed out             |
| 11.00 | SMTP Server | Server      | IP Ping timed out             |
| 10.58 | Switch 11   | Switch      | IP Ping timed out             |
| 10.58 | Switch 9    | Switch      | IP Ping timed out             |
| 10.57 | Switch 7    | Switch      | SNMP link-down TRAP           |
| 10.56 | SMTP Server | Server      | SMTP Service request timed out |
| 10.55 | NFS Server  | Server      | NFS Service request timed out  |

Table 2 illustrates an example of Events which may be listed in an Event log if the link 5a between switches 7 and 9 of the network 1 were to fail. In this circumstance, switch 7, and all other devices connected between the management station 3 and the broken link 5a would be responsive to requests from the management station 3. However, all other devices, which are "downstream" of the broken link 5a, such as switches 9 and 11, and servers 15 and 17 are cut off from the network management station 3 by the broken link.

As a result, the Event list includes: Ping requests to switches 9 and 11, and to servers 15 and 17 are timed out. The Ping requests cannot reach these devices and a response cannot be returned. A time out occurs since no response is received SNMP requests to switches 9 and 11 are also timed out. A NFS service request to NFS server 17 is timed out, as is a SMTP service request to SMTP server 15. In addition, a link down SNMP TRAP is received from switch 7, since switch 7 remains in communication with the network management station 3. All these Events occur in a short time period.

Typically, as with Table 2, the Events in the Event log are listed in time order i.e. as they occur. Thus the order of Events depends upon the stage of the monitoring process by the network management software application which has been reached when the link is broken, and thus the first Event is not necessarily the causal Event. For instance, in the example of Table 2, link 5a is broken just after SMTP and NFS service requests are sent, and these requests are therefore timed out before the SNMP TRAP is received from switch 7. The network administrator would therefore need to review all of the Events, as if they were unrelated, until the root cause is discovered, which is time consuming.

Accordingly, the network management station 3 in accordance with a preferred embodiment of the present invention automatically processes the Events to determine whether the Events are related, and if so, to determine which Event or Events in the list is indicative of the root cause of the Events, in the illustrated example, the broken link. It will be appreciated that other embodiments may monitor and process Events as they are received, or may process a list of Events to determine the causal Event under the control of the administrator.

In accordance with the preferred embodiment, the network management station 3 determines whether each received Event is potentially related to previously received Events. Events are considered to be potentially related if they occur within a short time of each other, for example within 2 minutes of each other. This is achieved by comparing the time of each new event with the time of a preceding Event or Events. Once a list of potentially related Events has been completed, the preferred embodiment then considers the type of Events in order to determine which Events in the list of potentially related Events are of a relevant type, and in turn which of those Events are of a similar type, and therefore considered to be related. In the preferred embodiment, the Events of interest are the types of Event which cause the network management station 3 to lose contact with devices on the network, due to breaks in links, loss of power to, or failure of, core devices, or high utilisation of devices or links. Thus, Events of interest comprise: "time out" Events, for example time outs to ICMP, SMTP, NFS and SNMP requests; "link-down" Events, "device reboot" Events and "very high utilisation" Events.

In accordance with the preferred embodiment, Events are considered prima facie to be related if they occur within a short time of each other, for example within 2 minutes of each other, and they are of a similar Event type. For example, "time out" Events and SNMP link-down TRAP Events are of a similar type, and "time out" Events and "high utilisation" are of similar Event type. However, SNMP "link down" and "high utilisation" Events are not of a similar Event type, and such Events are considered to be unrelated. It will be appreciated that other methods may be used to determine whether Events are related.

If the Events are found to be related, the network management station 3 then determines the position of the device causing the Event relative to the network management station. This is achieved using the pre-existing knowledge of the network topology stored in memory, as explained in more detail below. Once the position of all related Events is determined, the management station identifies that the causal Event or Events is or are the Event(s) in the list which relate to the device or devices nearest to the network management station 3.

The relative position of the device causing an Event and the management station may be determined by counting the number of links (and/or devices) in the shortest path between the relevant device and the network management station 3.

In one example, the network management station 3 uses the algorithm of UK Patent Application No 0009120.7 to determine the shortest path between the management station 3 and each device causing an Event. This provides a list of links (and/or devices) between the management station and the device. The program can then "count" the thus determined number of links (and/or devices) and store the determined number of links (and/or devices) along with the Event data.

In another example, the network management station may store in memory a look-up table indicating the number of links (and/or devices) in the shortest path between the network management station and each device on the network. Such a look-up table may be obtained during the process of "discovering" the topology of the network using an algorithm such as that disclosed in the aforementioned UK patent application. The look-up table can then be used by the program of the present invention.

Once the number of links (and/or devices) in the shortest path between the management station and the device causing the Event is determined for each Event, the network management station 3 determines the causal Event(s) by comparing the determined number of links (and/or devices) in each Event and selecting the Event(s) for which the number is the lowest.

Table 3 shows a list of links in the shortest path between each network device and the management station 3 for the network 1 shown in FIG. 1. Table 3 includes, for each device, a list of the links in the shortest path and a count of the number of links.

TABLE 3

| Device | Path to Management Station | No. links |
| --- | --- | --- |
| Switch 7 | Link(mgmt stn:switch7) | 1 |
| Switch 9 | Link(mgmt stn:switch7); Link(switch7:switch9) | 2 |
| NFS Server 17 | Link(mgmt stn:switch7); Link(switch7:switch9); Link(switch7:NFS Server) | 3 |
| Switch 11 | Link(mgmt stn:switch7); Link(switch7:switch9); Link(switch9:switch11) | 3 |
| SMTP Server 15 | Link(mgmt stn:switch7); Link(switch7:switch9); Link(switch9:switch11); Link(switch11:SMTP Server) | 4 |

From Table 3 it can be seen that switch 7 is the closest device to the network management station 3 with only one link to the management station, and switch 9 is the next closest with only two links.

Thus, in the example shown in Table 2, the network management station 3 determines that the SNMP TRAP sent at 10.57 by switch 7 is the most significant Event, since switch 7 has the fewest links in the shortest path between it and the management station. The management station 3 therefore selects this Event as the causal Event for display to the network administrator.

The network management station 3 performs a method in accordance with a preferred embodiment of the present invention to determine the causal Event. The method is preferably implemented in the form of a computer program running on the network management station. The method steps performed by a computer program are illustrated in FIG. 2.

Figure 2:
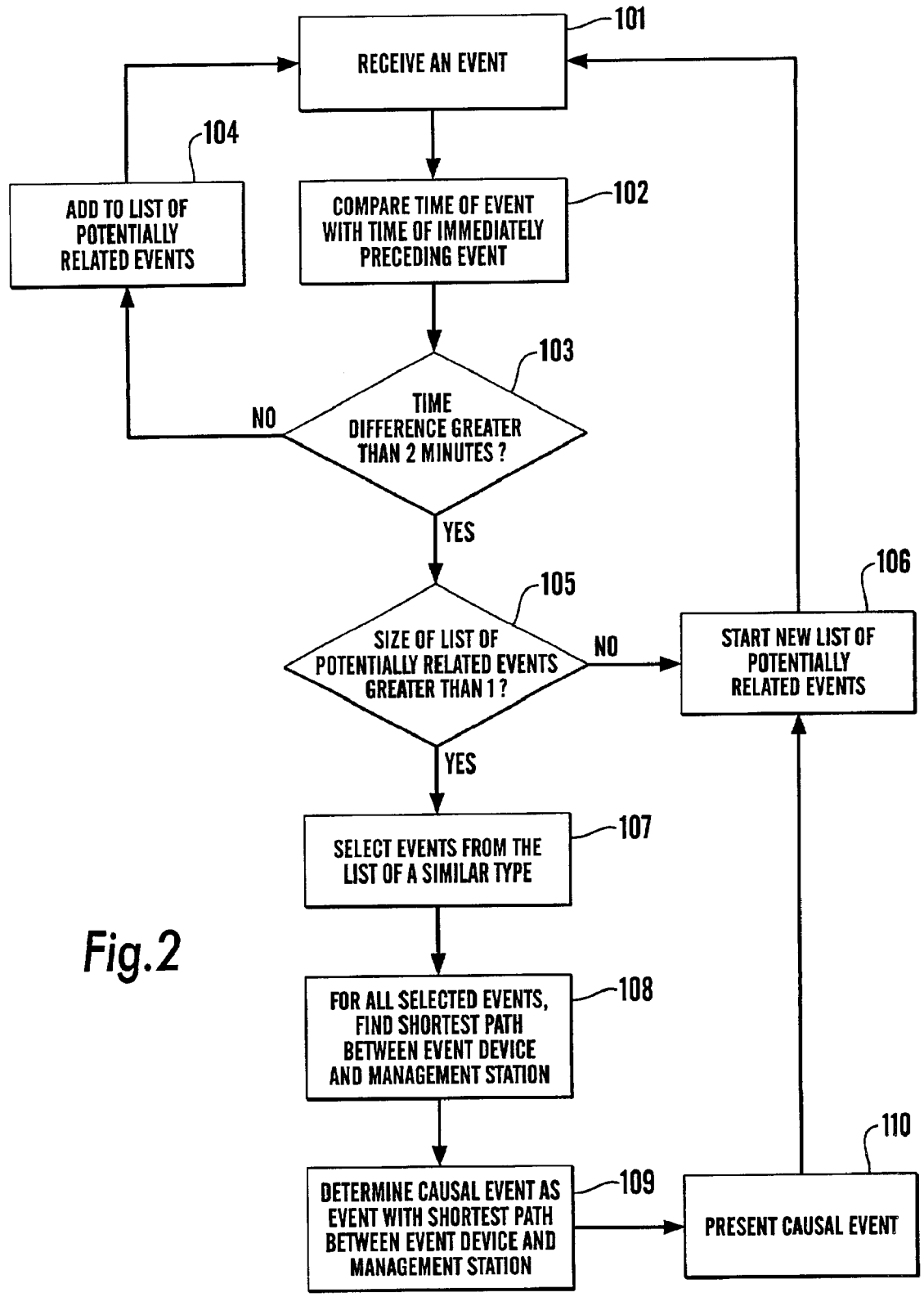
FIG. 2 is a flow diagram illustrating the program steps carried out by the network management station of FIG. 1 in accordance with the preferred embodiment.

FIG. 2 shows the program steps performed in accordance with a preferred embodiment of the present invention. It will be appreciated that other program sequences are possible.

At step 101, the program receives an Event generated by a network management software application, either as described above, or from another source.

At step 102, the program compares the time of the received Event with the time of the immediately preceding Event and determines the time difference. The time and other data relating to the immediately preceding Event is stored by the program in a list of potentially related Events, as will appreciated from the following.

At step 103, if the comparison at step 102 determines that the received Event did occur within 2 minutes (or any other a predetermined time period) of the immediately preceding Event, that is, the time difference is less than 2 minutes, the program continues with step 104. At step 104 the program adds the received Event to the list of previously received Events, which are considered to be potentially related, and the program then returns to step 101, when it receives a further Event.

At step 103, if the comparison at step 102 determines that the received Event did not occur within 2 minutes (or any other a predetermined time period) of the immediately preceding Event, that is, the time difference is greater than 2 minutes, the program continues with steps 105. This is because, if the time difference is greater than 2 minutes, no further Events can be received which are potentially related to the immediately preceding Event, and so the list of potentially related Events is complete. The received Event is the first Event of a new group of potentially related Events. At step 105, the program considers whether the list of potentially related Events is greater than one. If the list is not greater than one, then no causal Event needs to be determined. The program then continues at step 106, by starting a new list of potentially related Events with the received Event. If the list is greater than one, then the program continues with steps 107 to 109 to determine the causal Event, as described below.

Accordingly, the program continues at step 107 by selecting Events from the list of potentially related Events which are of a similar and relevant type as described above. At step 108, for each of the selected Events, the program determines the number of links in the shortest path between the management station and the relevant device causing the Event. (It will be appreciated that the number of devices, or the number devices and links, in the shortest path may be determined instead of the number of links as in the preferred embodiment.) At step 109, the causal Event is determined. The program compares the number of links in the shortest path for each Event selected by step 107 and determines as the causal Event (or Events) the Event for which the number of links in the shortest path is the lowest. At step 110 the program presents the determined causal Event or Events.

The program then continues with step 106 by starting a new list of potentially related Events with the received Event. It will be appreciated that the new Event list may replace the existing Event list or may be recorded separately in memory. From step 106, the program continues with step 101 when it receives a further Event.

It will be appreciated that various changes may be made to the program of FIG. 2. For instance, the program could determine the number of links in the shortest path for Events as they are received, and store this information in the Event list.

As the skilled person will appreciate from the foregoing, in accordance with a preferred embodiment, the present invention is implemented in the form of a computer program within a network management software application, which is provided on a computer readable medium. The computer readable medium may be a disk which can be loaded in a disk drive of the network management station 3 of the network of FIG. 1. Alternatively, the computer readable medium may be a computer system carrying the website or other form of file server from which the computer program may be downloaded over the Internet or other network.

As the skilled person will appreciate, various modifications and changes may be made to the described embodiments. It is intended to include all such variations, modifications and equivalents which fall within the spirit and scope of the present invention.

What is claimed is:

1. A method for identifying a causal event among a plurality of events detected by a network management station on a network, which causal event is indicative of the underlying cause of more than one of said plurality of events, wherein certain of the events are related wherein the network management station knows the topology of the network, the method performed by said network management station, and comprising the steps of:

for each related event in the plurality of events, determining the number of devices and/or links between a network causing the event and the network management station, and determining as said causal event, the event for which the determined number of devices and/or links is the fewest.

2. A method as claimed in claim 1, wherein the step of determining the number of devices and/or links between the device causing the event and the network management station comprises the steps of: determining the shortest path between the device causing the event and the network management station using the topology of the network and calculating the number of devices and/or links in the determined shortest path.

3. A method as claimed in claim 1, further comprising the step of: receiving each event, and automatically determining the number of devices and/or links between the device causing the event and the network management station.

4. A method as claimed in claim 3, further comprising storing the determined number of devices and/or links between the device causing the event and the network management station for each event.

5. A method as claimed in claim 1, wherein the step of determining as said causal event comprises the step of: selecting as the causal event, the event for which the number of devices and/or links between the device causing the event and the network management station, is the fewest.

6. A method as claimed in claim 1, further comprising determining if said plurality of events are related, and if it is determined that said plurality of events are related, storing said plurality of related events in an event list.

7. A method as claimed in claim 6, wherein the step of determining if the plurality of events are related comprises determining the type of event for each of the plurality of events, and determining that said plurality of events are related if the events are of a similar type.

8. A method as claimed in claim 6, wherein the method further comprises: receiving each event; and the step of determining if said plurality of events are related comprises the steps of: for each event, determining the time difference between the time of the received event and the time of the immediately preceding event, and determining that the received event is related to the immediately preceding event if the time difference is less than a predetermined time period.

9. A method as claimed in claim 8, wherein the predetermined time period is in the range 0 seconds to 5 minutes.

10. A method as claimed in claim 8, wherein, if the received event is determined to be related, the method further comprises the step of: storing the event in a list of related events, and if the received event is determined not to be related, the method further comprises the steps of: comparing the type of events in the existing list of related events, and selecting events of a similar, relevant type.

11. A method as claimed in claim 6, wherein the method further comprises: receiving each event; and the step of determining if said plurality of events are related comprises the steps of: for each event, comparing the type of the received event and the type of the immediately preceding event, and determining that the received event is related to the immediately preceding event if the step of comparing finds the event type of the received event is similar to the event type of the immediately preceding event.

12. A method as claimed in claim 6, wherein the method further comprises: receiving each event; and the step of determining if said plurality of events are related comprises the steps of: for each event, determining the time difference between the time of the received event and the time of the immediately preceding event, and comparing the type of the received event and the type of the immediately preceding event, and determining that the received event is related to the immediately preceding event if the time difference is less than a predetermined time period and the events are similar in type.

13. A method as claimed in claim 12, wherein the predetermined time period is in the range of 0 seconds to 5 minutes.

14. A method as claimed in claim 6, further comprising the steps of, receiving each event; automatically determining if the event is related to the immediately preceding event, and if it is determined that the received event is related, storing the received event in the event list.

15. A method as claimed in claim 14, wherein, if it is determined that the event is not related to the immediately preceding event, the method further comprises storing the received event in a new event list.

16. A computer readable medium having a computer program for carrying out the method as claimed in claim 1.

17. On a computer readable medium, a computer program for identifying a causal event among a plurality of events detected by a network management station on a network, which causal event is indicative of the underlying cause of more than one of said plurality of events, wherein certain of the events are related, and wherein the network management station knows the topology of the network, the computer program comprising:

program means for each related event determining for each related event the number of devices and/or links between a network device causing the event and the network management station, and program means for determining as said causal event, the event for which the determined number of devices and/or links is the fewest.

18. A network management apparatus for managing a network, comprising a network management station having a processor and memory, the memory storing data representing the topology of the network, wherein the network management station is configured to monitor the network and to generate events in finding predefined event conditions; wherein the network management station is further configured to identify a causal event among a plurality of related events generated by the network management station, which causal event is indicative of the underlying cause of more than one of said plurality related events, by:

for each related event, determining the number of devices and/or links between a network device causing the event and the network management station, and determining as said causal event, the event for which the determined number of devices and/or links is the fewest.

* * * * *